(12) United States Patent
Fritzin et al.

(10) Patent No.: US 12,360,205 B2
(45) Date of Patent: Jul. 15, 2025

(54) CALIBRATION OF A RADAR SYSTEM

(71) Applicant: Infineon Technologies AG, Neubiberg (DE)

(72) Inventors: Jonas Eric Sebastian Fritzin, Munich (DE); Martin Dechant, Graz (AT)

(73) Assignee: Infineon Technologies AG, Neubiberg (DE)

( * ) Notice: Subject to any disclaimer, the term of this patent is extended or adjusted under 35 U.S.C. 154(b) by 417 days.

(21) Appl. No.: 17/404,257

(22) Filed: Aug. 17, 2021

(65) Prior Publication Data

US 2022/0057482 A1 Feb. 24, 2022

(30) Foreign Application Priority Data

Aug. 21, 2020 (DE) .................. 102020121978.4

(51) Int. Cl.
*G01S 7/40* (2006.01)
*G01S 13/00* (2006.01)
*G01S 13/34* (2006.01)

(52) U.S. Cl.
CPC ............ *G01S 7/40* (2013.01); *G01S 7/4008* (2013.01); *G01S 7/4017* (2013.01); *G01S 13/003* (2013.01); *G01S 13/34* (2013.01)

(58) Field of Classification Search
None
See application file for complete search history.

(56) References Cited

U.S. PATENT DOCUMENTS

| 4,866,449 A * | 9/1989 | Gaffney | H03D 7/165 342/194 |
| 10,509,104 B1* | 12/2019 | Dato | G01S 13/87 |
| 2002/0131035 A1* | 9/2002 | Watanabe | G01S 7/4915 356/5.1 |
| 2012/0079890 A1* | 4/2012 | Ueberschlag | G01F 23/284 73/861.27 |
| 2015/0139348 A1* | 5/2015 | Tong | H04B 1/0053 375/267 |
| 2017/0285138 A1* | 10/2017 | Park | G01S 7/285 |
| 2018/0062260 A1* | 3/2018 | Khalil | H01Q 21/22 |
| 2019/0107425 A1* | 4/2019 | Welle | G01S 13/88 |
| 2019/0334634 A1* | 10/2019 | Zeng | H04B 17/318 |

(Continued)

FOREIGN PATENT DOCUMENTS

DE 102018130556 A1 6/2020

*Primary Examiner* — Vladimir Magloire
*Assistant Examiner* — Brandon James Henson
(74) *Attorney, Agent, or Firm* — Harrity & Harrity, LLP

(57) ABSTRACT

A method includes generating a first radar signal in a transmission channel of a first radar chip based on an oscillator signal and emitting the first radar signal via a first antenna, wherein the first radar signal is modulated based on a synchronization signal used in the first radar chip, generating a second radar signal in a transmission channel of a second radar chip based on the oscillator signal and emitting the second radar signal via a second antenna, wherein the second radar signal is modulated based on a synchronization signal used in the second radar chip, receiving an RF sensor signal by means of a sensor circuit, wherein the RF sensor signal has a superposition of a portion of the power of the first radar signal and a portion of the power of the second radar signal, and determining a measurement signal that depends on the RF sensor signal.

32 Claims, 6 Drawing Sheets

(56) References Cited

U.S. PATENT DOCUMENTS

2019/0334640 A1* 10/2019 Belfiore ................. H04B 1/40
2023/0129011 A1*  4/2023 Lulu ...................... H04B 1/18
                                                   455/552.1

* cited by examiner

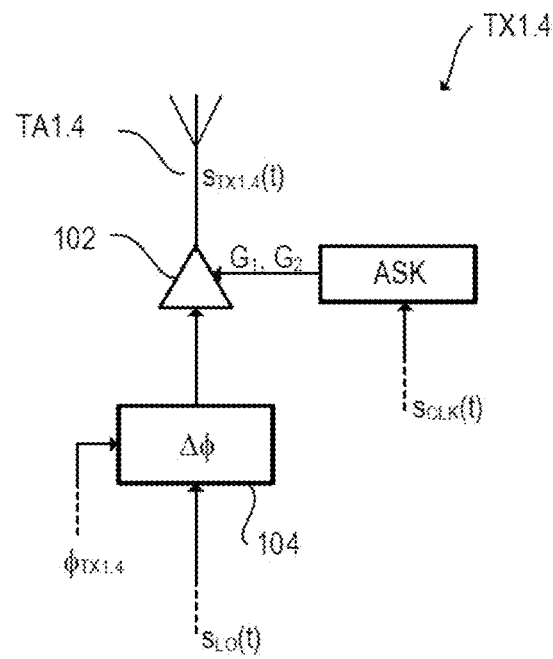
Fig. 6
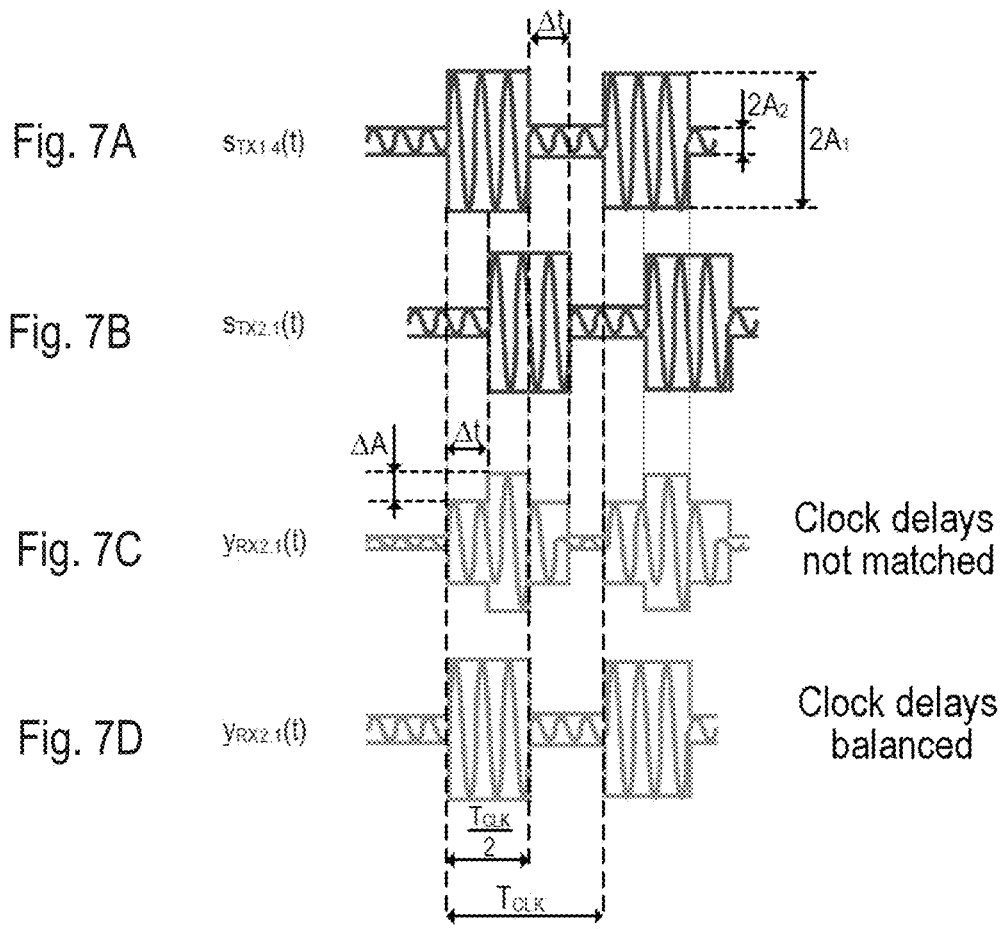
Fig. 7A
Fig. 7B
Fig. 7C — Clock delays not matched
Fig. 7D — Clock delays balanced

CALIBRATION OF A RADAR SYSTEM

RELATED APPLICATION

This application claims priority to German Patent Application No. 102020121978.4, filed on Aug. 21, 2020, which is incorporated herein by reference in its entirety.

FIELD

This description relates to the field of radar sensor technology, in particular a radar system comprising a plurality of radar chips.

BACKGROUND

Radar sensors are used in a wide variety of applications for detecting objects, wherein the detection usually involves measuring distances and speeds as well as azimuth angles, or directions of arrival (DoA) of the detected objects. In the automotive sector in particular, there is a growing demand for radar sensors which can be used in advanced driver assistance systems (ADAS), such as in adaptive cruise control (ACC) or radar cruise control systems. Such systems can automatically adjust the speed of an automobile to maintain a safe distance from other vehicles traveling in front (as well as from other objects and pedestrians). Other applications in the automotive sector include blind spot detection, lane change assist, collision warning, pedestrian detection, and the like. In the field of autonomous driving, radar sensors and systems with multiple sensors will play an important role in the control of autonomous vehicles.

Radar applications used in automobiles are subject to various road safety standards, such as the ISO 26262 functional safety standard entitled "Road Vehicles—Functional Safety". To ensure the functional safety of a radar sensor, it is important to know whether the current status of the radar sensor allows reliable distance and speed measurement. However, reliability can also be an issue for other applications. For this reason, radar sensors have been developed which are able to perform various types of self-tests and a calibration of certain parameters.

Accordingly, a radar system that offers improved calibration capabilities may be desirable.

SUMMARY

The above object is achieved by the example embodiments described herein and are the subject matter of the claims.

The following description relates to a method for a radar system. According to an exemplary embodiment, the method includes generating a first RF radar signal in a first transmission channel of a first radar chip based on an oscillator signal and emitting the first RF radar signal via a first transmitting antenna, wherein the first RF radar signal is modulated depending on a synchronization signal used in the first radar chip. The method also includes generating a second RF radar signal in a first transmission channel of a second radar chip based on the oscillator signal and emitting the second RF radar signal via a second transmitting antenna, wherein the second RF radar signal is modulated depending on a synchronization signal used in the second radar chip. In addition, the method includes receiving an RF sensor signal by means of a sensor circuit, which signal has a superposition of a portion of the power of the first RF radar signal and a portion of the power of the second RF radar signal, and determining a measurement signal that depends on the sensor signal.

According to another exemplary embodiment, the method includes generating a first RF radar signal in a first transmission channel of a first radar chip based on an oscillator signal and emitting the first RF radar signal via a first transmitting antenna, wherein the first RF radar signal is modulated depending on a synchronization signal used in the first radar chip. The method further includes generating a second RF radar signal in a first transmission channel of a second radar chip based on the oscillator signal and emitting the second RF radar signal via a second transmitting antenna, wherein the second RF radar signal is modulated depending on a synchronization signal used in the second radar chip. The method further includes receiving a first RF sensor signal by means of a sensor circuit, the first RF sensor signal including a portion of the power of the first RF radar signal, and receiving a second RF sensor signal by means of the sensor circuit, the second RF sensor signal including a portion of the power of the second RF radar signal. The method further includes determining a first measurement signal which depends on the first sensor signal, and determining a second measurement signal which depends on the second sensor signal. From this, a value is determined which represents the difference between the propagation times of the synchronization signal used in the first radar chip and of the synchronization signal used in the second radar chip.

Other exemplary embodiments relate to radar systems that are designed to carry out the methods described here.

BRIEF DESCRIPTION OF THE DRAWINGS

In the following text, exemplary embodiments are described based on illustrations. The illustrations are not necessarily true to scale and the exemplary embodiments are not limited to the aspects presented. Rather, the emphasis is given to illustrating the principles underlying the exemplary embodiments. In the drawings:

FIG. 6 shows an example of a transmission channel from FIG. 5 in more detail.

FIGS. 7A-7D show timing diagrams illustrating examples of the phase tuning of the system clock signals used by the radar chips.

DETAILED DESCRIPTION

Figure 1:
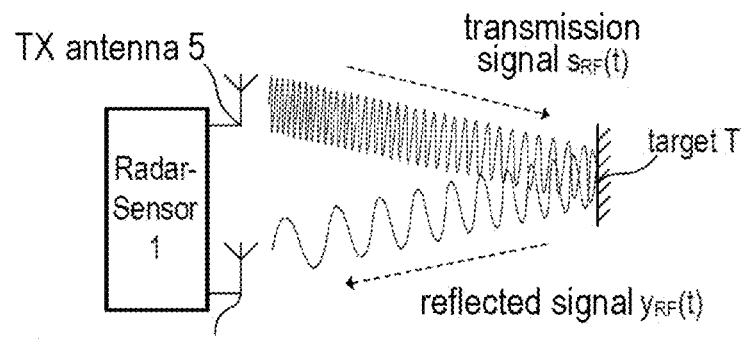
FIG. 1 shows a sketch illustrating the functional principle of an FMCW radar system for distance and/or speed measurement.

FIG. 1 illustrates the use of a frequency-modulated continuous wave (FMCW) radar system as a sensor for the detection (comprising the measurement of distances and speeds and, if applicable, DoA) of objects that are commonly referred to as radar targets. In this example, the radar device has 1 separate transmitting (TX) and receiving (RX) antennas 5 and 6 respectively (bistatic or pseudo-monostatic radar configuration). It should be noted, however, that an antenna that simultaneously functions as a transmitting antenna and as a receiving antenna can also be used (monostatic radar configuration). The transmitting antenna 5 emits an RF signal $s_{RF}(t)$, which is frequency modulated, for example, with a linear chirp signal (periodic, linear frequency ramp). The emitted signal $s_{RF}(t)$ is back-scattered at the radar target T and the back-scattered (reflected) signal $y_{RF}(t)$ is received by the receiving antenna 6. FIG. 1 shows a simplified example; in practice, radar sensors are systems with a plurality of transmission (TX) and reception (RX) channels, and the RF signal $s_{RF}(t)$ contains a plurality of sequences, each with a defined number of chirps.

Figure 2:
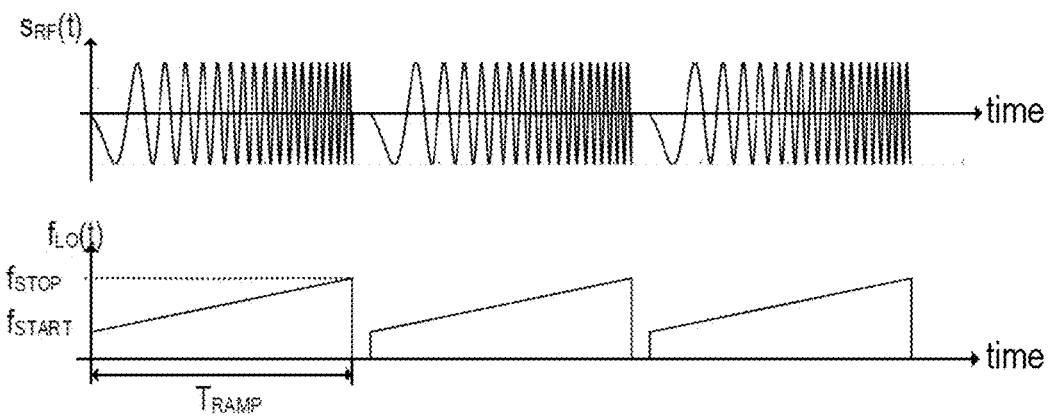
FIG. 2 shows two timing diagrams illustrating the frequency modulation of the RF signal generated by the FMCW system.

FIG. 2 illustrates the mentioned frequency modulation of the signal $s_{RF}(t)$. As shown in FIG. 2, the signal $s_{RF}(t)$ is composed of a plurality of "chirps", i.e. the signal $s_{RF}(t)$ comprises a sequence of sinusoidal signal waveforms with increasing (up-chirp) or decreasing (down-chirp) frequency (see upper diagram in FIG. 2). In this example, the instantaneous frequency $f_{LO}(t)$ of a chirp increases linearly within a time period $T_{RAMP}$ starting at a start frequency $f_{START}$ to a stop frequency $f_{STOP}$ (see the lower diagram in FIG. 2). Such chirps are also referred to as linear frequency ramps. FIG. 2 shows a sequence with three identical linear frequency ramps. It should be noted, however, that the parameters $f_{START}$, $f_{STOP}$, $T_{RAMP}$ and the pauses between the individual frequency ramps may vary. The frequency variation does not necessarily have to be linear as well. Other modulation techniques can be used as an alternative to frequency modulation. Other modulation types, such as PMCW (Phase-Modulated Continuous Wave), can also be used. The exemplary embodiments described here are not limited to FMCW radar systems.

Figure 3:
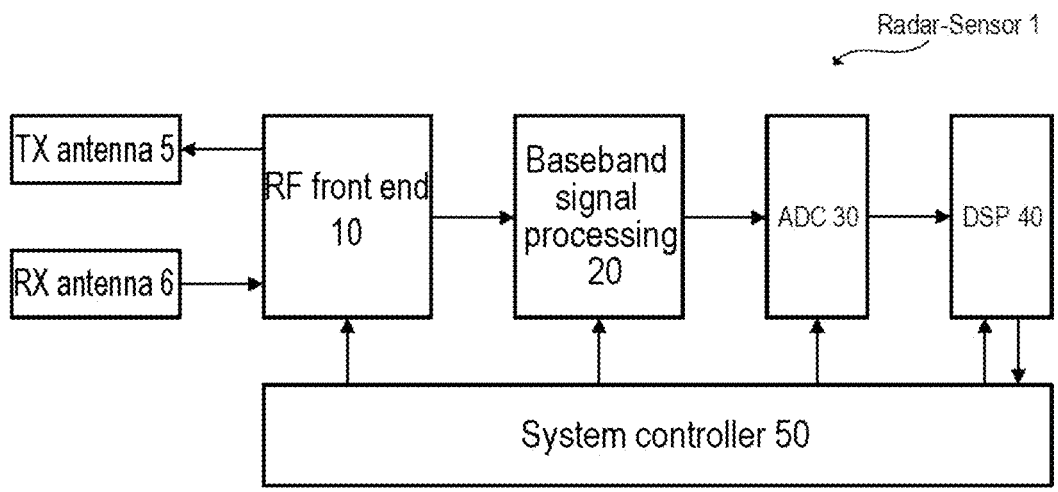
FIG. 3 shows a block diagram illustrating the basic structure of an FMCW radar system.

FIG. 3 is a block diagram which shows an example of a simplified structure of a radar device 1 (radar sensor). According to this, at least one transmitting antenna 5 (TX antenna) and at least one receiving antenna 6 (RX antenna) are connected to an RF front end 10 integrated in a radar chip, which can contain all the circuit components required for the RF signal processing. These circuit components comprise, for example, a local oscillator (LO), RF power amplifier, phase shifter, low-noise amplifier (LNA), directional couplers (e.g. rat-race couplers, circulators, capacitive couplers, etc.) and mixers for down-mixing the RF signals into the baseband or an intermediate frequency band (IF band). The RF front end 10, possibly together with other circuit components, is integrated into the radar chip, which is also known as a monolithic microwave integrated circuit (MMIC).

In radar applications, the local oscillator signal generated by the local oscillator is usually in the SHF (Super High Frequency, centimeter-wave) or the EHF (Extremely High Frequency, millimeter-wave) band, e.g. in the range from 76 GHz to 81 GHz or in the 24 GHz ISM band (Industrial, Scientific and Medical band) in some automotive applications.

The example illustrated shows a bistatic (or pseudo-monostatic) radar system with separate RX and TX antennas. In the case of a monostatic radar system, a single antenna would be used for both emitting and receiving the electromagnetic (radar) signals. In this case, a directional coupler (e.g. a circulator) can be used to separate the RF signals to be emitted from the received RF signals (radar echoes). As mentioned above, in practice radar systems usually comprise a plurality of transmission and reception channels with a plurality of transmitting and receiving antennas, which allows, among other things, a measurement of the direction of arrival (DoA) from which the radar echoes are received. This direction is usually represented by an angle (azimuth angle). In such multiple input, multiple output (MIMO) systems, the individual TX channels and RX channels are usually identical or similar in design. This means that the radar front end 10 can comprise a plurality of transmission and reception channels, which can also be distributed across a plurality of radar chips. In practical applications, the transmission and reception channels of a radar system are distributed across a small number (e.g. two to 10 or even more) interconnected radar chips.

In the case of a PMCW or FMCW radar system, the RF signals emitted via the TX antenna 5 can be in the range of approximately 20 GHz to 100 GHz (e.g. approximately 77 GHz in some applications). The transmitted RF signals are therefore millimeter waves. As mentioned above, the RF signal received by the RX antenna 6 contains the radar echoes, i.e. the signal components that are scattered back from one or more radar targets. The received RF signal $y_{RF}(t)$ is, for example, down-mixed into the baseband and further processed in the baseband using analog signal processing (see FIG. 3, analog baseband signal processing chain 20). Radar systems often do not distinguish precisely between the baseband and the intermediate frequency band (IF band). In the following, the term baseband is used. The analog baseband signal processing essentially comprises a filtering (e.g. high and low pass) and, if necessary, amplification of the baseband signal. The baseband signal is finally digitized (see FIG. 3, analog-to-digital converter 30) and further processed in the digital domain.

The digital signal processing chain can be implemented at least partly by means of software, which can be executed on a processor, for example. In addition or alternatively, the digital signal processing chain can also contain hard-wired computing units. In general terms, the digital baseband signal processing is carried out by a computing unit 40 (see FIG. 3), which can contain both hard-wired digital computing circuits and one-time programmable (OTP) digital computing circuits as well as one or more processors (for example, a microcontroller or digital signal processor) that execute software instructions. In this context, a computing unit is understood to mean any circuit or group of circuits capable of performing the functions and calculations described here. Many different types of suitable implementations of computing units are well known to the person skilled in the art and are therefore not discussed in detail here. The computing unit 40 can also be distributed over a plurality of chips or spatially separated units.

The entire system is usually controlled by a system controller 50, which can also be implemented at least partially in software that can be executed on a processor such as a microcontroller. The RF front end 10 and the analog baseband signal processing chain 20 (and optionally also the analog-to-digital converter 30 and parts of the digital signal processing) can be integrated in a single common MIMIC (i.e. an RF semiconductor chip). Alternatively, the individual components can also be distributed over more than one integrated circuit. The computing unit 40 can also be integrated in a chip together with the system controller, but this is not necessarily the case.

Figure 4:
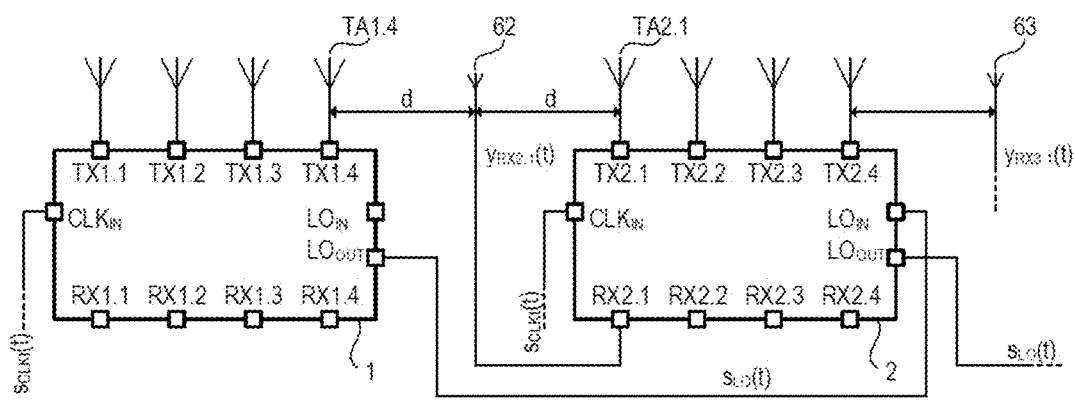
FIG. 4 shows an example of a radar system with two or more coupled radar chips.

FIG. 4 illustrates an example of a system having a plurality of radar chips that can be arranged on a circuit board. In this example, two radar chips 1, 2 are shown. Both radar chips 1, 2 comprise a plurality of transmission channels TX1.1, TX1.2, TX1.3, TX1.4 and TX2.1, TX2.2, TX2.3, TX2.4 respectively, and a plurality of reception channels RX1.1, RX1.2, RX1.3, RX1.4 and RX2.1, RX2.2, RX2.3, RX2.4 respectively. The RF outputs of the transmission channels are coupled with associated antennas. In the example shown in FIG. 4, the transmission channel TX1.4 of the radar chip 1 is connected to the transmitting antenna TA1.4 and the transmission channel TX2.1 of the radar chip 2 is connected to the transmitting antenna TA2.1. Not all of the radar chips necessarily have to comprise reception channels. In some exemplary embodiments, the radar system comprises radar chips that only comprise transmission channels (but not reception channels). In FIG. 4, only one receiving antenna 62 is drawn, which is connected to the RF input of the reception channel RX2.1. The other receiving antennas have been omitted in FIG. 4 to preserve the clarity of the drawing. In the example from FIG. 4, the receiving antenna 63 is connected to a reception channel of another radar chip (not shown).

The radar chips 1, 2 each receive (at a clock input pin $CLK_{IN}$) a system clock signal $s_{CLK}(t)$, the frequency $f_{CLK}$ of which is in the range of several tens to several hundred MHz, for example, i.e. usually in the VHF band (Very High Frequency, 20-300 MHz). The clock signals $s_{CLK}(t)$ received by the radar chips 1, 2 are based on the same signal source (clock generator), which can be arranged in the system controller 50 or in a separate chip, for example. The clock generator can be a quartz oscillator. The clock signals $s_{CLK}(t)$ received by the radar chips 1, 2 are therefore synchronous and have the same frequency $f_{CLK}$, however the phases of the clock signals received in the radar chips 1, 2 may differ from each other due to propagation time differences. The radar chips 1, 2 require the clock signal $s_{CLK}(t)$ for the clocking of analog-to-digital converters and for the operation of various digital circuits, among other functions.

In the radar chips 1, 2 a distinction is made between the master chip and the slave chip, wherein—as in the example from FIG. 4—the master chip (radar chip 1) usually contains a local oscillator which generates a local oscillator signal $s_{LO}(t)$. For example, the local oscillator can include a phase-locked loop (PLL), wherein the reference signal of the phase-locked loop is based on the clock signal $f_{CLK}$. With regard to the local oscillator signal $s_{LO}(t)$, the radar chips 1, 2, etc. can be coupled in a manner similar to a daisy chain arrangement, for example. This means that the master chip 1 outputs the local oscillator signal $s_{LO}(t)$ at an RF contact $LO_{OUT}$ (LO output) and the slave chip 2 receives this local oscillator signal $s_{LO}(t)$ at a corresponding LO contact LOIN (LO input). The slave chip 2 can also have a LO output $LO_{OUT}$, at which the local oscillator signal $s_{LO}(t)$ is provided for another slave chip (not shown in FIG. 4). A plurality of radar chips can be coupled to a MIMO system in this way, although the LO signal does not necessarily need to be distributed in the form of a daisy chain arrangement. In other exemplary embodiments, the LO output of the master chip 1 can be connected to a power splitter or splitter, which splits the LO signal and forwards a portion of the power to each of the LO inputs of the slave chips. The example from FIG. 4 shows that the LO signals $s_{LO}(t)$ used by each radar chip are all coherent (i.e. the signals $s_{LO}(t)$ essentially have the same signal shape), however, due to propagation time differences the phases of the LO signals $s_{LO}(t)$ used in the individual radar chips may be different. The radar chips 1, 2 can be connected to a computing unit 40 and a system controller 50 (see FIG. 3) and communicate with them (e.g. via one or more serial data connections).

For accurate detection of radar targets, in particular for accurate determination of the angle of incidence (DoA) of the radar echoes, stable and defined phase relationships between the radar signals emitted by the individual transmitting antennas (which are all based on the LO signal of the respective chip) are important. For this reason, various approaches and techniques for measuring and calibrating the phases have been developed. A new approach is described in more detail below.

Figure 5:
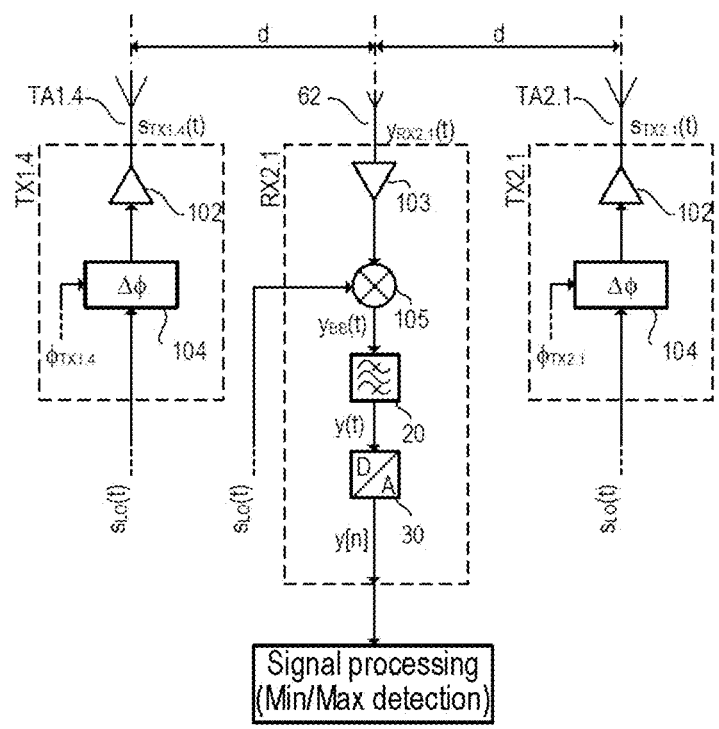
FIG. 5 shows examples of two transmission channels arranged in different radar chips, as well as a reception channel of the radar system from FIG. 4.

FIG. 5 illustrates an exemplary implementation of the transmission channels TX1.4 and TX2.1, which are arranged in different chips, and the reception channel RX2.1. At this point it should be noted that FIG. 5 is a simplified circuit diagram to show the basic structure of an RF front end 10. Actual implementations, which can depend heavily on the specific application, can be more complex and will usually have multiple TX and/or RX channels. Furthermore, FIG. 5 shows only those components of the reception channel RX1 and the transmission channel TX1 that are necessary for the following discussion of the exemplary embodiments. It is to be understood that actual implementations are more complex and may comprise additional components (e.g. couplers, RF power sensors, phase shifters, etc.). The reception channels essentially have the same design and each comprise an RF power amplifier 102 and a phase shifter 104. The power amplifier 102 amplifies the local oscillator signal $s_{LO}(t)$ which is present in the respective radar chip. The phase shifter 104 is designed to change the phase of the local oscillator signal $s_{LO}(t)$ fed to the input of the power amplifier 102 by an adjustable value $\Delta\phi_{1.4}$ (for channel TX1.4) or $\Delta\phi_{2.1}$ (for channel TX2.1). Various implementations of the power amplifier 102 and phase shifter 104 are known per se and are therefore not discussed further here. The output signals of the power amplifiers 102 are also the output signals $s_{TX1.4}(t)$ and $s_{TX2.1}(t)$ of the associated transmission channels TX1.4 and TX2.1 respectively and can be emitted by the associated antennas TA1.4 and TA2.1.

The reception channel RX2.1 shown in FIG. 5 comprises an RF amplifier 103 (e.g. LNA=Low Noise Amplifier), a mixer 105, as well as the baseband signal processing chain 20 and the analog-to-digital converter 30 (see FIG. 3). The amplifier 103 receives the antenna signal $y_{RX2.1}(t)$ applied at the RF input of the reception channel RX2.1. The preamplified antenna signal is fed to the first RF input of the mixer 105, whereas the local oscillator signal $s_{LO}(t)$ is fed to the second RF input (reference input) of the mixer 105. The mixer 105 is designed to down-mix the amplified antenna signal $g \cdot y_{RX2.1}(t)$ (gain g) into the baseband using the local oscillator signal $s_{LO}(t)$. The resulting baseband signal $y_{BB}(t)$ is further processed in the analog baseband signal processing chain 20. The analog output signal of the reception channel RX2.1 is denoted by y(t). This is digitized using the analog-to-digital converter 30 and the corresponding digital output signal is denoted by y[n] (where n is the time index). The digital radar signal y[n] is processed further, for example, by the computing unit 40. The digital signal processing will be described in more detail later.

In this example, the mixer 105 mixes the pre-amplified RF reception signal $g \cdot y_{RF}(t)$ down into the baseband. Mixing can be carried out in one step (i.e. from the RF band directly into the baseband) or via one or more intermediate steps (i.e. from the RF band into an intermediate frequency band and then into the baseband). In this case, the receiver mixer 105 effectively comprises a plurality of individual mixer stages connected in series. In some radar systems, IQ demodulators are used as mixers to obtain an analytical baseband signal (with in-phase and quadrature components).

In the examples from FIGS. 4 and 5, the receiving antenna 62 is arranged exactly between the antennas TA1.4 and TA2.1. This means that the distance between the transmitting antenna TA1.4, which is connected to the first radar chip 1, and the receiving antenna 62, and the distance between the receiving antenna and the transmitting antenna TA2.1, which is connected to the second radar chip 2, are equal. This means that the signal propagation times of the antennas TA1.4 and TA2.1 and the receiving antenna 62 are also equal (distance d), which has certain advantages to be explained later.

In the following, crosstalk, or so-called short-range leakage is considered, i.e. RF signals that are transmitted directly (without reflection at a radar target in the measuring range of the sensor system) by the transmitting antennas TA1.4 or TA2.1 to the receiving antenna 62. The equal distances d result in an equal propagation time between the antennas. In the following it is assumed that the local oscillator signal $s_{LO}(t)$ is a CW signal without frequency modulation and both transmitting antennas TA1.4 and TA2.1 emit the corresponding radar signal $s_{TX1.4}(t)$ or $s_{TX2.1}(t)$ simultaneously, which means that the receiving antenna receives a superposition of the two signals $s_{TX1.4}(t)+s_{TX2.1}(t)$. This superposition $s_{TX1.4}(t)+s_{TX2.1}(t)$ is also referred to in the following as the sensor signal since the receiving antenna 62 can also be considered as a sensor or probe for the purpose of carrying out calibration measurements. The amplitude of the resulting baseband signal (and thus also the amplitude of the resulting digital radar signal y[n] at the output of the reception channel RX2.1) depends on the power and phase of the signals $s_{TX1.4}(t)$ and $s_{TX2.1}(t)$.

For example, the signals $s_{TX1.4}(t)$ and $s_{TX2.1}(t)$ in the signal path of the reception channel RX2.1 will be destructively superimposed if the phase difference between the signals $s_{TX1.4}(t)$ and $s_{TX2.1}(t)$ is approximately 180° (7c rad). Conversely, the signals $s_{TX1.4}(t)$ and $s_{TX2.1}(t)$ in the signal path of the reception channel RX2.1 will be constructively superimposed if the phase difference between the signals $s_{TX1.4}(t)$ and $s_{TX2.1}(t)$ is approximately 0° (0 rad). Destructive interference means that the amplitudes of the two signals subtract, i.e. the signal power is (partially) canceled out. Constructive interference means that the amplitudes of the two signals are added together, i.e. the signal power is added. The digital radar signal y[n] at the output of the reception channel RX2.1 can be considered as a measurement of the signal power of the sensor signal $s_{TX1.4}(t)+s_{TX2.1}(t)$ (i.e. the superposition of the signals $s_{TX1.4}(t)$ and $s_{TX2.1}(t)$).

In a first calibration procedure, the phase of the transmission signal $s_{TX1.4}(t)$ is varied using the phase shifter 105 arranged in the transmission channel TX1.4 (phase shift $\phi_{TX1.4}$), while the amplitude of the digital radar signal y[n] is monitored. With regard to the calibration measurements performed, the digital radar signal y[n] can also be considered as a measurement signal which depends on the amplitude or power of the superposition $s_{TX1.4}(t)+s_{TX2.1}(t)$ (of the sensor signal) and thus also represents the amplitude or power of the superposition $s_{TX1.4}(t)+s_{TX2.1}(t)$.

When the amplitude of the digital radar signal y[n] (measurement signal) reaches a maximum, a constructive interference is present and the phases of the signals $s_{TX1.4}(t)$ and $s_{TX2.1}(t)$ are the same. The phase value $\phi_{TX1.4}$ at which the digital radar signal y[n] reaches a maximum level is stored. The phase shift $\phi_{TX2.1}$ is not changed and remains constant. Alternatively, the phase shift $\phi_{TX2.1}$ can be varied while the phase value $\phi_{TX1.4}$ is kept constant. Both phase shifts $\phi_{TX1.4}$ and $\phi_{TX2.1}$ can also be varied. The aim is to find a combination of $\phi_{TX1.4}$ and $\phi_{TX2.1}$ at which the amplitude of the digital radar signal y[n] reaches a maximum.

Alternatively, the phase shift $\phi_{TX1.4}$ can be varied until the level of the digital radar signal y[n] reaches a minimum. In this case, destructive interference is present and the phases of the signals $s_{TX1.4}(t)$ and $s_{TX2.1}(t)$ differ by 180°. By subsequently inverting (i.e. changing through) 180° one of the phase shifts $\phi_{TX1.4}$ or $\phi_{TX2.1}$, a phase equality can then also be established. In other words, the phase value $\phi_{TX1.4}$ at which the digital radar signal y[n] reaches a minimum level is inverted and stored. After the calibration procedure is completed, the phases of the output signals of the transmission channels TX1.4 and TX2.1 are calibrated in the subsequent normal radar operation (i.e. when performing radar measurements).

At this point it should be noted that using the approach described here, the phases of the output signals of two transmission channels in different radar chips can be matched, or balanced. The balancing of the phases of the output signals of transmission channels within the same radar chip can be achieved by means of other methods known per se. For systems with more than two radar chips, the calibration process can be repeated. In the example from FIG. 4, the calibration procedure could be repeated with the transmission channel TX2.4 of the second radar chip 2 and the transmission channel TX3.1 and a reception channel RX3.1 of a third radar chip (not shown in FIG. 4).

By means of a slight modification of the system, the approach to phase calibration described above also allows a balancing of the phases of the clock signals $s_{CLK}(t)$ used by the radar chips. The clock signal $s_{CLK}(t)$ is also referred to as a synchronization signal because the operation of the circuits (especially the digital circuits) in the radar chips 1 and 2 is synchronized by means of the synchronization signal. Therefore, the phases of the clock signals/synchronization signals $s_{CLK}(t)$ received in each of the radar chips 1, 2 may also have an influence on the accuracy of the radar measurements, for example because the clock signals $s_{CLK}(t)$ define the sampling times of the analog-to-digital converters. For the balancing of the phases of the clock signals $s_{CLK}(t)$, the output signals $s_{TX1.4}(t)$ and $s_{TX2.1}(t)$ are amplitude modulated with the clock signal $s_{CLK}(t)$ available in the respective radar chip 1 or 2. As in the phase calibration procedure described above, the amplitude-modulated output signals $s_{TX1.4}(t)$ and $s_{TX2.1}(t)$ of the transmission channels TX1.4 and TX2.1 are emitted simultaneously via the antennas TA1.4 and TA2.1 respectively, and the reception channel RX2.1 receives a superposition $s_{TX1.4}(t)+s_{TX2.1}(t)$ of the two amplitude-modulated signals.

The amplitude modulation of the clock signal/synchronization signal $s_{CLK}(t)$ in the individual radar chips 1, 2 in the exemplary embodiments described here is an amplitude shift keying (ASK) process. This means that at a first level of the clock signal $s_{CLK}(t)$ (e.g. a High level) the output signal $s_{TX1.4}(t)$ of the transmission channel TX1.4 is generated with a first (e.g. relatively high) amplitude $A_1$ and at a second level of the clock signal $s_{CLK}(t)$ (e.g. a Low level) the output signal $s_{TX1.4}(t)$ of the transmission channel TX1.4 is generated with a second (e.g. relatively low) amplitude $A_2$. The envelope of the resulting amplitude-modulated signal $s_{TX1.4}(t)$ then essentially corresponds to the shape of the clock signal $s_{CLK}(t)$. The peak-to-peak amplitude values $2 \cdot A_1$ and $2 \cdot A_2$ are shown in FIGS. 7A-7D.

One way of providing the amplitude modulation is to modify the gain of the power amplifiers 102 arranged in the transmission channels TX1.4 and TX2.1. The example from FIG. 6 illustrates the transmission channel TX4.1 as an example. The circuit labeled ASK is designed to change the gain of the amplifier 102 synchronously with the clock signal $s_{CLK}(t)$, with the gain being switched back and forth between $G_1$ and $G_2$, which essentially causes amplitude modulation (amplitude shift keying, ASK) of the output signal $s_{TX1.4}(t)$. At this point it should be noted that the gain $G_1$, for example, can also be zero (i.e. the amplifier is switched on and off). In this case, the modulation depth is 100%.

The effect of amplitude modulation on the signal power of the superposition $s_{TX1.4}(t)+s_{TX2.1}(t)$ is shown in FIGS. 7A-7D. The diagram (a) from FIGS. 7A-7D shows schematically the amplitude-modulated output signal $s_{TX1.4}(t)$ of the transmission channel TX1.4 of the first radar chip 1, and the diagram (b) from FIGS. 7A-7D shows schematically the amplitude-modulated output signal $s_{TX2.1}(t)$ of the transmission channel TX2.1 of the second radar chip 2. In the example shown, the envelopes of the signals $s_{TX1.4}(t)$ and $s_{TX2.1}(t)$ are phase-shifted, because the clock signal used in the second radar chip 2 is slightly delayed relative to the clock signal used in the first radar chip 1. The delay is a result of different signal propagation times and is denoted by $\Delta t$ in FIGS. 7A-7D. The delay $\Delta t$ can also be considered as a propagation time difference between the clock signals $s_{CLK}(t)$ used in the radar chips 1 and 2.

The diagram (c) from FIGS. 7A-7D shows the superposition $y_{RX2.1}(t) s_{TX1.4}(t)+s_{TX2.1}(t)$ of the signals $s_{TX1.4}(t)$ and $s_{TX2.1}(t)$ received by the receiving antenna 62 for the case in which the propagation time difference $\Delta t$ has not been balanced. In contrast, FIGS. 7A-7D, diagram (d) shows the superposition $s_{TX1.4}(t)+s_{TX2.1}(t)$ of the signals $s_{TX1.4}(t)$ and $s_{TX2.1}(t)$ received by the receiving antenna 62 for the case of balanced propagation times. It can be seen in the diagrams (c) and (d) that when the signal propagation times are not balanced, the envelope of the received RF signal $y_{RX2.1}(t)$ exhibits three different amplitude values (see diagram (c) from FIGS. 7A-7D), whereas when the signal propagation times are balanced, the envelope of the received RF signal $y_{RX2.1}(t)$ exhibits only two different amplitude values (see diagram (d) from FIGS. 7A-7D). The envelope curve signal is determined by down-mixing the RF signal $y_{RX2.1}(t)$ in the reception channel RX2.1. This means that the digital signal y[t] essentially corresponds to the envelope curve signal. The amplitude difference $\Delta A$ shown in FIGS. 7A-7D, diagram (c), for example, can be determined relatively easily in the computing unit by means of signal processing. If this amplitude difference $\Delta A$ is zero, it can then be concluded that the propagation times of the clock signals $s_{CLK}(t)$ are balanced. In an adjustment process (tuning), for example, the clock signal received in the second radar chip 2 can be delayed by means of a delay circuit until the measured amplitude difference $\Delta A$ vanishes. This means that the clock signal received in the second radar chip 2 is gradually delayed by an ever greater amount, starting from that in diagram (c) of FIGS. 7A-7D, until the propagation times are balanced and the situation shown in diagram (d) of FIGS. 7A-7D is reached.

In addition, or alternatively, the propagation delay $\Delta t$ can also be determined directly in the envelope curve signal (in this example, the output signal y[n] of the reception channel RX2.1). Signal processing algorithms for determining $\Delta t$ are known per se and are therefore not further explained here. For example, the broadening of the pulse width compared to the normal pulse width $T_{CLK}/2$ in the situation shown in FIGS. 7A-7D, diagram (c) can be determined ($T_{CLK}=f_{CLK}^{-1}$).

In the previous examples, the antenna 62 receives the signals emitted by the antennas TA1.4 TA2.1 due to direct crosstalk and/or short-range leakage (reflections at very close objects located directly in front of the antennas and are not within the measuring range of the radar system). Alternatively, instead of the antenna 62 a symmetrical coupler structure can also be provided, which is designed to superimpose the output signals $s_{TX1.4}(t)$ and $s_{TX2.1}(t)$ (or at least a portion of their power) and feed the superposition signal into the input of the reception channel RX2.1. This structure is symmetrical if the signal paths from the RF output of the transmission channel TX1.4 to the RF input of the reception channel RX2.1 and from the RF output of the transmission channel TX2.1 to the RF input of the reception channel RX2.1 are the same length.

Figure 8:
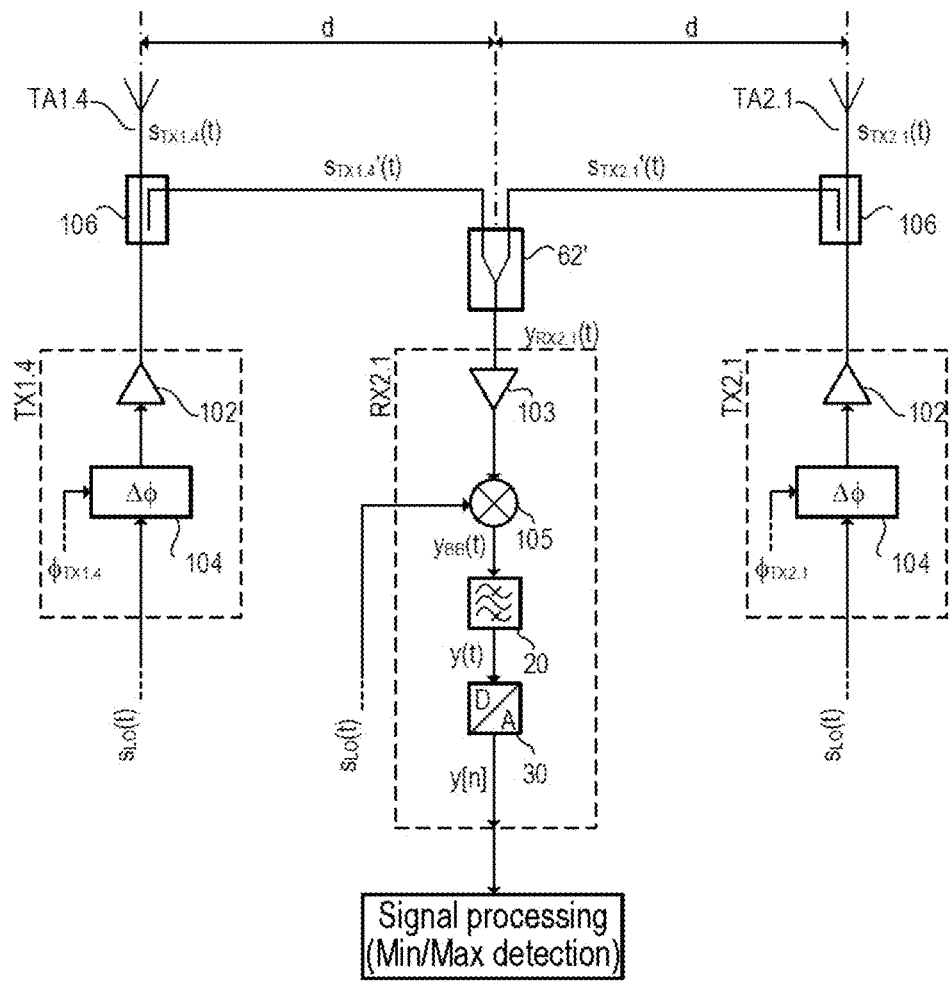
FIG. 8 shows an example of an alternative to the example of FIG. 5.

FIG. 8 shows a further exemplary embodiment, illustrating an alternative to the example described in FIG. 5. The transmission channels TX1.4 and TX2.1 as well as the reception channel RX2.1 can be part of the radar system from FIG. 4. The transmission and reception channels TX1.4, TX2.1, RX2.1 in FIG. 8 can be structured in the same way as the corresponding components in FIG. 5. However, instead of the receiving antenna 62, the example from FIG. 8 comprises a somewhat more complex sensor circuit with two couplers 106 and the one power combiner 62'. A first of the couplers 106 is connected to the output of the transmission channel TX1.4 and is designed to couple out a portion of the power of the output signal $s_{TX1.4}(t)$. Likewise, a second of the couplers 106 is connected to the output of the transmission channel TX2.1 and is designed to couple out a portion of the output signal $s_{TX2.1}(t)$. The associated output RF signals are denoted by $s_{TX1.4}'(t)$ and $s_{TX2.1}'(t)$, respectively. In the power combiner 62', the two RF signals $s_{TX1.4}'(t)$ and $s_{TX2.1}'(t)$ coupled out at the outputs of the transmission channels TX1.4 and TX2.1 are combined, i.e. a superposition takes place. The output signal $y_{RX2.1}(t)$ of the power combiner 62' is therefore the summed signal $s_{TX1.4}'(t)+s_{TX2.1}'(t)$.

For example, the power combiner 62' can be implemented as a Wilkinson combiner. However, other circuits known per se can also be used as power combiners. The couplers 106 can be designed as directional couplers. Suitable circuits (e.g., coupler circuits in microstrip technology) are known per se and are therefore not explained further here. To ensure that the output RF signals $s_{TX1.4}'(t)$ and $s_{TX2.1}'(t)$ have the same propagation time through the sensor circuit (up to the input of the reception channel RX2.1), the cable lengths of the signal paths between the two couplers 106 and the associated inputs of the power combiner 62 are the same. The sensor circuit with coupler 106 and power combiner 62' then essentially produces the same result as the (sensor) antenna 62 in the example from FIG. 5. The implementation from FIG. 8 can have the advantage in comparison to the implementation from FIG. 5, that it prevents a multipath reception due to interferences of multiple reflections (multipath interference).

Figure 9:
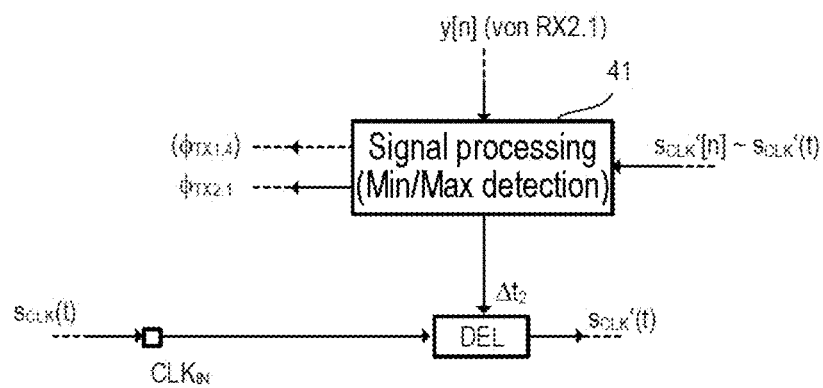
FIG. 9 shows an example of a control circuit for adjusting the propagation delay of the system clock signal received from a radar chip and for matching the phase at the output of a transmission channel with a corresponding transmission channel of a neighboring radar chip.

FIG. 9 illustrates an example of a control circuit for the above-described adjustment of the propagation delay of the system clock signal $s_{CLK}(t)$ received by a radar chip (e.g. radar chip 2, see FIGS. 4 and 5) and for balancing the phase at the output of a transmission channel (e.g. TX2.1) with a corresponding transmission channel (e.g. TX1.4, see FIG. 5) of a neighboring radar chip (e.g. radar chip 1). The control circuit 41 can be viewed as part of the computing unit 40 and in the present example it is contained in the radar chip 2. However, parts of the control circuit can also be contained, for example, in the system controller 50 (see FIG. 3) or in other subsystems.

In a calibration procedure for balancing the phase shifts $\phi_{TX2.1}$ and/or $\phi_{TX1.4}$, the control circuit receives the digital radar signal y[n], which is used as a measurement signal for the amplitude of the superposition of the two RF output signals $s_{TX1.4}(t)$ and $s_{TX2.1}(t)$ (see FIGS. 5 and 8). As explained above, the level of the measurement signal y[n] is a maximum if the phases of the RF output signals $s_{TX1.4}(t)$ and $s_{TX2.1}(t)$ are equal, and a minimum if the phases of the RF output signals $s_{TX1.4}(t)$ and $s_{TX2.1}(t)$ are inverted (i.e. offset by 180°). The control circuit is designed to monitor the measurement signal y[n] for a plurality of phase shifts $\phi_{TX2.1}$ of the phase shifter 104 arranged in the transmission channel TX2.1 and to determine the phase shift $\phi_{TX2.1}$ at which the measurement signal y[n] becomes a maximum. In practice, this maximum search can also be carried out in such a way that the phase shift $\phi_{TX2.1}$ at which the measurement signal y[n] assumes a minimum is determined first, and then the phase shift $\phi_{TX2.1}$ is inverted. During this process, the phase shift $\phi_{TX1.4}$ of the phase shifter 104 arranged in the transmission channel TX1.4 remains at a preset value. It is to be understood that alternatively, the phase shift $\phi_{TX1.4}$ can be varied until the measurement signal y[n] assumes a maximum, while the phase shift $\phi_{TX2.1}$ remains at a predefined value. After the calibration/balancing procedure, a combination of phase shifts $\phi_{TX1.4}$ and $\phi_{TX2.1}$ is set at which the measurement signal y[n] assumes a maximum. The phases of the RF output signals $s_{TX1.4}(t)$ and $s_{TX2.1}(t)$ are equal (balanced).

In addition, or alternatively, the control circuit 41 can also adjust a propagation time delay $\Delta t_2$ of the clock signal $s_{CLK}(t)$ received by the second radar chip 2, so that the clock signals used in the two neighboring radar chips 1, 2 have the same propagation delay in relation to the clock source. As already explained with reference to FIGS. 7A-7D, there are many ways to determine different propagation delays (in relation to the common clock signal source) of the clock signals $s_{CLK}(t)$ received in the individual radar chips. For example, digital signal processing can be used to directly determine a difference $\Delta t$ between two propagation delays (e.g. the difference of the propagation delays of the clock signals $s_{CKL}(t)$ entering the radar chips 1 and 2). Alternatively, the amplitude difference $\Delta A$ shown in FIGS. 7A-7D can be determined. If the amplitude difference $\Delta A$ is zero, then the difference $\Delta t$ is also zero.

Figure 10:
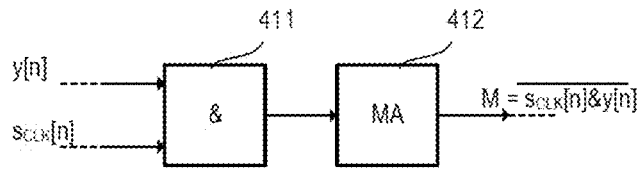
FIG. 10 shows an example of a part of the control circuit from FIG. 9.

In one exemplary embodiment, the control circuit 41 is accordingly designed to adjust the propagation delay of the clock signal $s_{CLK}(t)$ received in the second radar chip 2 by a delay value $\Delta t_2$ such that the amplitude difference $\Delta A$ becomes a minimum (i.e. zero). In another exemplary embodiment, the control circuit is designed to measure directly the time offset $\Delta t$ shown in FIGS. 7A-7D and to adjust the delay value $\Delta t_2$ in such a way that this time offset $\Delta t$ becomes minimum (i.e. zero). In a further exemplary embodiment, the control circuit is designed to logically combine the measurement signal y[n] with a digital version $s_{CLK}[n]$ of the clock signal (e.g. an AND operation) and to average the resulting signal by means of filtering. The filtered signal M will then have a maximum level if the time offset $\Delta t$ is zero. The delay value $\Delta t_2$ at which the time offset $\Delta t$ is zero is stored and used in the subsequent calibration measurements. An example of this approach is illustrated in FIG. 10. The AND gate 411 combines the signals y[n] and $s_{CLK}[n]$ and the filter 412 forms a moving average M. This depends on the propagation delay $\Delta t_2$ that is set, and is a maximum when the propagation delays of the clock signals received in the radar chips 1 and 2 with respect to the signal source are equal. In another implementation, an XOR operation can be used instead of an AND operation. In this case, the mean value M becomes a minimum when the propagation delays of the clock signals received in the radar chips 1 and 2 with respect to the signal source are equal.

Figure 11:
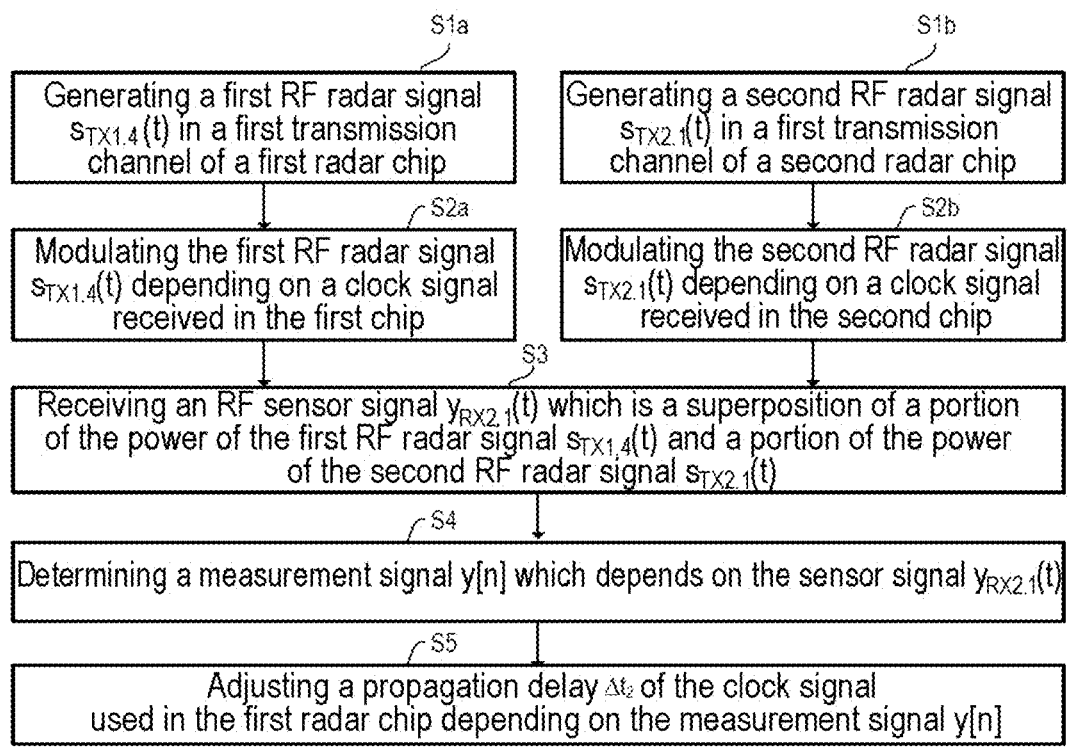
FIG. 11 shows an example of the method described here using a flowchart.

Various exemplary embodiments of the methods and concepts described here are summarized below. A first example of a method for a radar system is shown in the flowchart of FIG. 11. According to FIG. 11, the method comprises generating a first RF radar signal (see FIG. 4, signal sTX1.4(t)) in a first transmission channel (see FIG. 4, channel TX1.4) of a first radar chip (1) based on an oscillator signal (see FIG. 4, LO signal sLO(t)), and emitting the first RF radar signal via a first transmitting antenna (FIG. 11, step S1a). The first RF radar signal is modulated (see FIG. 4, clock signal sCLK(t)) depending on a synchronization signal (e.g., a first synchronization signal) used in the first radar chip (FIG. 11, step S2a). The method also comprises generating a second RF radar signal (see FIG. 4, signal sTX2.1 (t)) in a first transmission channel (see FIG. 4, channel TX2.1) of a second radar chip based on the oscillator signal as well as emitting the second RF radar signal via a second transmitting antenna (FIG. 11, step S1b). The second RF radar signal is modulated (see FIG. 4, clock signal sCLK(t)) depending on a synchronization signal (e.g., a second synchronization signal) used in the second radar chip (FIG. 11, step S2b).

As described above, a superposition of the two RF radar signals (see FIG. 4, signals $s_{TX1.4}(t)$ and $s_{TX2.1}(t)$ can be achieved in different ways. In the example of FIG. 5, a receiving antenna (sensor antenna) receives the direct crosstalk of the two adjacent antennas and thus the above-mentioned superposition. In the example of FIG. 8, RF couplers are used for the same purpose. The method shown in FIG. 11 also comprises receiving an RF sensor signal (see FIG. 4 signal $y_{RX2.1}(t)$), which is a superposition of a portion of the power of the first and second RF radar signals (FIG. 11, step S3). In the next step, a measurement signal (see FIG. 5, signal y[n]) is determined, which depends on the sensor signal (FIG. 11, step S3). As explained above, the measurement signal can be a digital signal representing the envelope curve of the sensor signal.

The measurement signal can now be evaluated, for example, to detect whether the clock signals received at the clock inputs $CLK_{IN}$ of each of the radar chips (see FIG. 4) have approximately the same phase (corresponding to a propagation delay) relative to the clock signal source. As mentioned above, different signal processing methods can be used for this purpose. If it is determined that the clock signals received at the clock inputs $CLK_{IN}$ of the individual radar chips have a different phase/propagation delay, a calibration/adjustment of the propagation delay is possible. In the example shown in FIG. 11 (step S5), the method therefore comprises adjusting a propagation delay $\Delta t_2$ of the clock signal used in the second radar chip depending on the measurement signal. In addition, or alternatively, the propagation delay of the clock signal in the other chip can also be adjusted.

The step S5 shown in FIG. 11 is optional, because in some exemplary embodiments the information contained in the measurement signal about the phase/propagation time differences of the clock signals can be used later in the normal radar measurement mode to correct the radar measurements, which means that an adjustment of the propagation delay is not absolutely necessary. It is to be understood that the steps shown in the flowchart do not necessarily need to be performed in the order shown. In practice, the steps shown can be performed essentially at the same time.

The determination of the measurement signal (FIG. 11, step S5) may comprise down-mixing of the RF sensor signal into the baseband. The resulting baseband signal can then be used as a measurement signal. In the examples described here, the measurement signal is digitized and further digitally processed. However, analog processing is also possible for the purpose of calibration of phase/propagation delay. In the examples described here, the RF sensor signal in a reception channel (see FIG. 4, channel RX2.1) is processed in a similar way to a received radar signal.

The modulation of the first and second RF radar signals can comprise an amplitude modulation, such as amplitude shift keying (ASK), wherein the amplitude of the respective RF radar signal (High or Low) is set to a first or second value respectively, depending on the level of the synchronization signal used in the first or second radar chip. As mentioned, the synchronization signals used in the first and second radar chip are binary signals, which can have different propagation delays in relation to a clock signal source.

In addition to or as an alternative to the calibration of the propagation delays of the clock signals, the circuit structures from FIGS. 4, 5, and 8 also allow a phase calibration of the LO signals received in the radar chips. To this end, the method shown in FIG. 11 may also comprise an adjustment (by means of at least one phase shifter) of the phase of the first RF radar signal (see FIG. 4, signal $s_{TX1.4}(t)$) and/or a phase of the second RF radar signal (see FIG. 4, signal $s_{TX2.1}(t)$) by means of at least one phase shifter (see FIG. 4, phase shifter 104). The phase of the RF radar signal is then adjusted in the transmission channel in question in such a way that the measured signal approximately assumes an extreme value (e.g. a maximum).

Finally, it should be noted that in order to determine the differences in the propagation times of the clock signals used in the individual radar chips, the amplitude-modulated RF radar signals $s_{TX1.4}(t)$ and $s_{TX2.1}(t)$ (see FIGS. 4 and 5) do not necessarily need to be generated simultaneously. In this case, no superposition takes place in the RF range. At first, only the transmission channel TX1.4 is active and the RF sensor signal $y_{RX2.1}(t)$ is only a portion of the power of the RF output signal $s_{TX1.4}(t)$. Consequently, the resulting measurement signal y[n] represents only the envelope curve of $s_{TX1.4}(t)$. Thereafter, only the transmission channel TX2.1 is active and the RF sensor signal $y_{RX2.1}(t)$ is only a portion of the power of the RF output signal $s_{TX2.1}(t)$. Consequently, the resulting measurement signal y[n] represents only the envelope curve of $s_{TX2.1}(t)$ (not the envelope curve of the superposition). For both cases, a phase of the measurement signal y[n] can be determined (e.g. relative to the clock signal received in the second radar chip). The difference of the phases represents the difference of the propagation delays of the clock signals received in the two radar chips considered. This variant of the approach described here is shown in FIG. 12.

Figure 12:
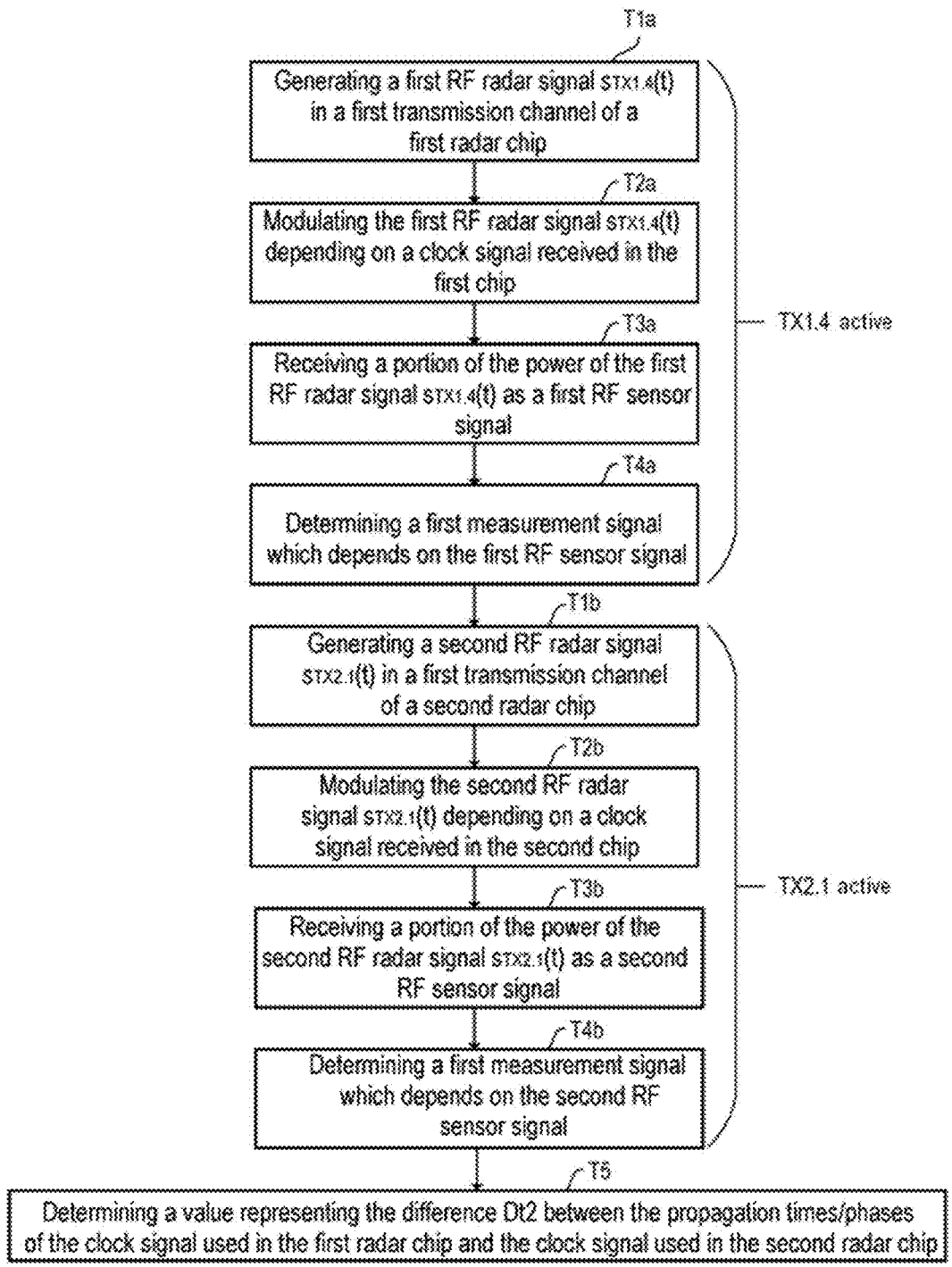
FIG. 12 shows a further exemplary embodiment of the method described here, illustrating an alternative to the method described in FIG. 11.

The method summarized in the flowchart from FIG. 12 can be viewed as an alternative to the example from FIG. 11. The circuit structures from FIGS. 5 and 8 are essentially suitable for carrying out the method from FIG. 12. Only the signal processing of the measurement signals y[n] (output signal of channel RX2.1) differs in the two variants. The steps T1a, T1b and T2a and T2b shown in FIG. 12 are the same as the steps S1a, S1b, S2a and S2b in FIG. 11, however, the steps T1a and T1b are not executed simultaneously but sequentially, so that no superposition of the RF output signals $s_{TX1.4}(t)$ and $s_{TX2.1}(t)$ occurs. Depending on which transmission channel is active (in the example of FIGS. 4 and 5, TX1.4 or TX2.1), a portion of the power of the RF output signals $s_{TX1.4}(t)$ (step T3a) or a portion of the power of the RF output signals $s_{TX2.1}(t)$ (step T3a) is received as the (first or second) RF sensor channel $y_{RX2.1}(t)$.

For the present example this means: if the transmission channel TX1.4 is active, in the sensor circuit (which contains the reception channel RX2.1) an output signal y[n] (first measurement signal) is generated which depends on the first RF sensor signal (FIG. 12, step T4a). If the transmission channel TX2.1 is active, an output signal y[n] (second measurement signal) which depends on the second RF sensor signal is generated in the sensor circuit (FIG. 12, step T4a). As mentioned above, the signal represents the envelope of the respective RF sensor signal. Due to the amplitude modulation (e.g. ASK) of the RF output signals $s_{TX1.4}(t)$ and $s_{TX2.1}(t)$, associated measurement signals will have a corresponding signal shape. The measurement signals y[n] each have a specific phase (corresponding to a propagation delay) relative to the clock signal $s_{CLK}(t)$ present in the second radar chip 2, which can be simply determined using means known per se.

The absolute phase of the clock signal $s_{CLK}(t)$ relative to the signal source is not relevant to the determination of the phase as long as the same clock signal $s_{CLK}(t)$ is used as a reference for determining the phase/propagation delay of the first measurement signal (y[n] when TX1.4 is active) and the second measurement signal (y[n] when TX2.1 is active). The difference of the phases thus determined corresponds to a propagation delay $\Delta$ta by which the clock signal used in radar chip 2 lags (or leads) the clock signal used in radar chip 1. Using a delay element (see FIG. 9, delay circuit DEL), this propagation time difference can be balanced. In a specific embodiment, the tuning process is carried out with varying delay values $\Delta t_2$ until the averaged propagation time difference is approximately zero.

What is claimed is:

1. A method for a radar system, the method comprising:
generating a first radio frequency (RF) radar signal in a first transmission channel of a first radar chip based on an oscillator signal and emitting the first RF radar signal via a first transmitting antenna, wherein the first RF radar signal is modulated according to a first synchronization signal used in the first radar chip;
generating a second RF radar signal in a second transmission channel of a second radar chip based on the oscillator signal and emitting the second RF radar signal via a second transmitting antenna, wherein the second RF radar signal is modulated according to a second synchronization signal used in the second radar chip;
receiving, via a receiving antenna arranged between the first transmitting antenna and the second transmitting antenna, an RF sensor signal, wherein the RF sensor signal is a superposition of a crosstalk of the first RF radar signal and a crosstalk of the second RF radar signal;

generating a measurement signal representing a signal power of the RF sensor signal; and performing, based on the measurement signal, a phase calibration comprising:

adjusting, using at least one phase shifter, at least one of a phase of the first RF radar signal or a phase of the second RF radar signal in such a way that the measurement signal, representing the signal power of the RF sensor signal, approximately assumes an extreme value.

2. The method of claim 1, wherein performing the phase calibration comprises:

sequentially adjusting a respective phase setting of the at least one phase shifter according to a plurality of phase shift values in order to adjust at least one of the phase of the first RF radar signal or the phase of the second RF radar signal a plurality of times;

for each phase shift value of the plurality of phase shift values, measuring the measurement signal to obtain one or more measurement values representing the signal power of the RF sensor signal;

based on each measurement value, determining for which phase shift value of the plurality of phase shift values the measurement signal approximately assumes the extreme value; and calibrating the at least one phase shifter with the phase shift value of the plurality of phase shift values the measurement signal approximately assumes the extreme value such that the phase of the first RF radar signal and the phase of the second RF radar signal are balanced.

3. The method of claim 2, wherein generating the first RF radar signal includes modulating the first RF radar signal according to the first synchronization signal such that the first RF radar signal is maintained at a first peak-to-peak amplitude while the first synchronization signal has a first signal level and is maintained at a second peak-to-peak amplitude while the first synchronization signal has a second signal level, and wherein generating the second RF radar signal includes modulating the second RF radar signal according to the second synchronization signal such that the second RF radar signal is maintained at a third peak-to-peak amplitude while the second synchronization signal has the first signal level and is maintained at a fourth peak-to-peak amplitude while the second synchronization signal has the second signal level.

4. The method of claim 1, wherein performing the phase calibration comprises:

sequentially adjusting a respective phase setting of the at least one phase shifter according to a plurality of phase shift values in order to adjust a phase difference between the first RF radar signal and the second RF radar signal a plurality of times;

for each phase shift value of the plurality of phase shift values, measuring the measurement signal to obtain one or more measurement values representing the signal power of the RF sensor signal;

based on each measurement value, determining for which phase shift value of the plurality of phase shift values the measurement signal approximately assumes the extreme value; and calibrating the at least one phase shifter with the phase shift value of the plurality of phase shift values the measurement signal approximately assumes the extreme value such that the phase difference is approximately zero.

5. The method of claim 1, wherein the first synchronization signal and the second synchronization signal are clock signals that originate from a clock signal source and have different propagation delays in relation to the clock signal source, and wherein performing the phase calibration comprises:

compensating, using the at least one phase shifter, for the different propagation delays such that the measurement signal assumes the extreme value.

6. The method of claim 5, wherein compensating for the different propagation delays comprises:

sampling the measurement signal for different phase shift values of the at least one phase shifter to obtain a plurality of measurement values of the measurement signal, wherein each measurement value of the plurality of measurement values corresponds to a different phase relationship between the phase of the first RF radar signal and the phase of the second RF radar signal; and based on the plurality of measurement values, determining a phase value for each phase shifter of the at least one phase shifter at which the measurement signal assumes the extreme value for use during a radar operation.

7. The method of claim 5, wherein generating the first RF radar signal includes modulating a peak-to-peak amplitude of the first RF radar signal to vary synchronously with changes in a signal level of the first synchronization signal such that an envelope of the first RF radar signal corresponds to a shape of the first synchronization signal, and wherein generating the second RF radar signal includes modulating a peak-to-peak amplitude of the second RF radar signal to vary synchronously with changes in a signal level of the second synchronization signal such that an envelope of the second RF radar signal corresponds to a shape of the second synchronization signal, wherein an envelope of the RF sensor signal is representative of a superposition of the envelope of the first RF radar signal, corresponding to the shape of the first synchronization signal, and the envelope of the second RF radar signal, corresponding to the shape of the second synchronization signal.

8. The method of claim 1, wherein generating the first RF radar signal includes modulating a peak-to-peak amplitude of the first RF radar signal to vary synchronously with changes in a signal level of the first synchronization signal such that an envelope of the first RF radar signal changes synchronously with changes in a shape of the first synchronization signal, wherein generating the second RF radar signal includes modulating a peak-to-peak amplitude of the second RF radar signal to vary synchronously with changes in a signal level of the second synchronization signal such that an envelope of the second RF radar signal changes synchronously with changes in a shape of the second synchronization signal, and wherein an envelope of the RF sensor signal is representative of a superposition of the envelope of the first RF radar signal, corresponding to the shape of the first synchronization signal, and the envelope of the second RF radar signal, corresponding to the shape of the second synchronization signal.

9. The method as claimed in claim 1, wherein performing the phase calibration comprises:
adjusting, using the at least one phase shifter, at least one of the phase of the first RF radar signal or the phase of the second RF radar signal in such a way that the measurement signal approximately assumes the extreme value for half of a signal period of the first synchronization signal and the second synchronization signal.

10. The method of claim 9, wherein performing the phase calibration comprises:
sampling the measurement signal for different phase shift values of the at least one phase shifter to obtain a plurality of measurement values of the measurement signal, wherein each measurement value of the plurality of measurement values corresponds to a respective phase relationship of different phase relationships between the phase of the first RF radar signal and the phase of the second RF radar signal; and
based on the plurality of measurement values, determining a phase value for each phase shifter of the at least one phase shifter at which the measurement signal assumes the extreme value for half of the signal period.

11. The method of claim 1, wherein the at least one phase shifter includes a first phase shifter arranged in the first transmission channel.

12. The method of claim 11, wherein the at least one phase shifter includes a second phase shifter arranged in the second transmission channel.

13. A radar system, comprising:
a first radar chip comprising a first transmission channel configured to generate a first radio frequency (RF) radar signal and cause a first transmitting antenna to emit the first RF radar signal, wherein the first transmission channel is configured to modulate the first RF radar signal according to a first synchronization signal used in the first radar chip;
a second radar chip comprising a second transmission channel configured to generate a second RF radar signal and cause a second transmitting antenna to emit the second RF radar signal, wherein the second transmission channel is configured to modulate the second RF radar signal according to a second synchronization signal used in the second radar chip; and
a sensor circuit configured to:
receive, via a receiving antenna arranged between the first transmitting antenna and the second transmitting antenna, an RF sensor signal, wherein the RF sensor signal is a superposition of a crosstalk of the first RF radar signal and a crosstalk of the second RF radar signal,
generate a measurement signal representing a signal power of the RF sensor signal, and
perform, based on the measurement signal, a phase calibration comprising a phase calibration of the first RF radar signal and the second RF radar signal, the phase calibration including adjusting, using at least one phase shifter, at least one of a phase of the first RF radar signal or a phase of the second RF radar signal in such a way that the measurement signal, representing the signal power of the RF sensor signal, approximately assumes an extreme value.

14. The radar system of claim 13, wherein the sensor circuit, for performing the phase calibration, is configured to:
sequentially adjust a respective phase setting of the at least one phase shifter according to a plurality of phase shift values in order to adjust at least one of the phase of the first RF radar signal or the phase of the second RF radar signal a plurality of times,
for each phase shift value of the plurality of phase shift values, measure the measurement signal to obtain one or more measurement values representing the signal power of the RF sensor signal,
based on each measurement value, determine for which phase shift value of the plurality of phase shift values the measurement signal approximately assumes the extreme value, and
calibrate the at least one phase shifter with the phase shift value of the plurality of phase shift values the measurement signal approximately assumes the extreme value such that the phase of the first RF radar signal and the phase of the second RF radar signal are balanced.

15. The radar system of claim 14, wherein the first transmission channel is configured to generate the first RF radar signal by modulating the first RF radar signal according to the first synchronization signal such that the first RF radar signal is maintained at a first peak-to-peak amplitude while the first synchronization signal has a first signal level and is maintained at a second peak-to-peak amplitude while the first synchronization signal has a second signal level, and
wherein the second transmission channel is configured to generate the second RF radar signal by modulating the second RF radar signal according to the second synchronization signal such that the second RF radar signal is maintained at a third peak-to-peak amplitude while the second synchronization signal has the first signal level and is maintained at a fourth peak-to-peak amplitude while the second synchronization signal has the second signal level.

16. The radar system of claim 13, wherein the sensor circuit, for performing the phase calibration, is configured to:
sequentially adjust a respective phase setting of the at least one phase shifter according to a plurality of phase shift values in order to adjust a phase difference between the first RF radar signal and the second RF radar signal a plurality of times,
for each phase shift value of the plurality of phase shift values, measure the measurement signal to obtain one or more measurement values representing the signal power of the RF sensor signal,
based on each measurement value, determine for which phase shift value of the plurality of phase shift values the measurement signal approximately assumes the extreme value; and
calibrate the at least one phase shifter with the phase shift value of the plurality of phase shift values the measurement signal approximately assumes the extreme value such that the phase difference is approximately zero.

17. The radar system of claim 13, wherein the first synchronization signal and the second synchronization signal are clock signals that originate from a clock signal source and have different propagation delays in relation to the clock signal source, and
wherein the sensor circuit, for performing the phase calibration, is configured to:
compensate, using the at least one phase shifter, for the different propagation delays such that the measurement signal approximately assumes the extreme value.

18. The radar system of claim 17, wherein the sensor circuit, for compensating for the different propagation delays, is configured to:
- sample the measurement signal for different phase shift values of the at least one phase shifter to obtain a plurality of measurement values of the measurement signal, wherein each measurement value of the plurality of measurement values corresponds to a respective phase relationship of different phase relationships between the phase of the first RF radar signal and the phase of the second RF radar signal,
- based on the plurality of measurement values, determine a phase value for each phase shifter of the at least one phase shifter at which the measurement signal approximately assumes the extreme value, and
- calibrate, for a radar operation, each phase shifter with the phase value at which the measurement signal approximately assumes the extreme value.

19. The radar system of claim 17, wherein the first transmission channel is configured to generate the first RF radar signal by modulating a peak-to-peak amplitude of the first RF radar signal to vary synchronously with changes in a signal level of the first synchronization signal such that an envelope of the first RF radar signal corresponds to a shape of the first synchronization signal,
- wherein the second transmission channel is configured to generate the second RF radar signal by modulating a peak-to-peak amplitude of the second RF radar signal to vary synchronously with changes in a signal level of the second synchronization signal such that an envelope of the second RF radar signal corresponds to a shape of the second synchronization signal, and
- wherein an envelope of the RF sensor signal is representative of a superposition of the envelope of the first RF radar signal, corresponding to the shape of the first synchronization signal, and the envelope of the second RF radar signal, corresponding to the shape of the second synchronization signal.

20. The radar system of claim 13, wherein the first transmission channel is configured to generate the first RF radar signal by modulating a peak-to-peak amplitude of the first RF radar signal to vary synchronously with changes in a signal level of the first synchronization signal such that an envelope of the first RF radar signal changes synchronously with changes in a shape of the first synchronization signal,
- wherein the second transmission channel is configured to generate the second RF radar signal by modulating a peak-to-peak amplitude of the second RF radar signal to vary synchronously with changes in a signal level of the second synchronization signal such that an envelope of the second RF radar signal changes synchronously with changes in a shape of the second synchronization signal, and
- wherein an envelope of the RF sensor signal is representative of a superposition of the envelope of the first RF radar signal, corresponding to the shape of the first synchronization signal, and the envelope of the second RF radar signal, corresponding to the shape of the second synchronization signal.

21. The radar system as claimed in claim 13, wherein the sensor circuit, for performing the phase calibration, is configured to:
- adjust, using the at least one phase shifter, at least one of the phase of the first RF radar signal or the phase of the second RF radar signal in such a way that the measurement signal approximately assumes the extreme value for half of a signal period of the first synchronization signal and the second synchronization signal.

22. The radar system of claim 21, wherein the sensor circuit, for performing the phase calibration, is configured to:
- sample the measurement signal for different phase shift values of the at least one phase shifter to obtain a plurality of measurement values of the measurement signal, wherein each measurement value of the plurality of measurement values corresponds to a respective phase relationship of different phase relationships between the phase of the first RF radar signal and the phase of the second RF radar signal,
- based on the plurality of measurement values, determine a phase value for each phase shifter of the at least one phase shifter at which the measurement signal approximately assumes the extreme value for half of the signal period, and
- calibrate, for a radar operation, each phase shifter with the phase value at which the measurement signal approximately assumes the extreme value for half of the signal period.

23. The radar system of claim 13, wherein the first transmission channel includes a first phase shifter, a first adjustable gain amplifier, and a first modulation circuit,
- wherein the first phase shifter is configured to receive a first oscillator signal, and provide the first oscillator signal, with a first phase setting, to the first adjustable gain amplifier,
- wherein the first adjustable gain amplifier is configured to, based on a first gain setting, adjust a peak-to-peak amplitude of the first oscillator signal to generate the first RF radar signal,
- wherein the first modulation circuit is configured to receive the first synchronization signal and adjust the first gain setting to correspond to a signal level of the first synchronization signal such that a peak-to-peak amplitude of the first RF radar signal varies synchronously with changes in a signal level of the first synchronization signal,
- wherein the second transmission channel includes a second phase shifter, a second adjustable gain amplifier, and a second modulation circuit,
- wherein the second phase shifter is configured to receive a second oscillator signal, and provide the second oscillator signal, with a second phase setting, to the second adjustable gain amplifier,
- wherein the second adjustable gain amplifier is configured to, based on a second gain setting, adjust a peak-to-peak amplitude of the second oscillator signal to generate the second RF radar signal, and
- wherein the second modulation circuit is configured to receive the second synchronization signal and adjust the second gain setting to correspond to a signal level of the second synchronization signal such that a peak-to-peak amplitude of the second RF radar signal varies synchronously with changes in a signal level of the second synchronization signal.

24. The radar system of claim 23, wherein the sensor circuit, for performing the phase calibration, is configured to:
- sequentially adjust, using at least one of the first phase shifter or the second phase shifter, a phase difference between the first RF radar signal and the second RF radar signal a plurality of times to obtain a plurality of phase differences, for each phase difference of the plurality of phase differences, measure the measurement signal to obtain one or more measurement values representing the signal power of the RF sensor signal, based on each measurement value, determine which phase difference of the plurality of phase differences the measurement signal approximately assumes the extreme value, determine corresponding phase shift values of the first phase shifter and the second phase shifter that correspond to the phase difference of the plurality of phase differences the measurement signal approximately assumes the extreme value, and calibrate the first phase shifter and the second phase shifter according to the corresponding phase shift values.

25. The radar system of claim 23, wherein the sensor circuit, for performing the phase calibration, is configured to:

sample the measurement signal for different phase shift value combinations of the first phase shifter and the second phase shifter to obtain a plurality of measurement values of the measurement signal, wherein each measurement value of the plurality of measurement values corresponds to a respective phase shift value combination of the different phase shift value combinations, based on the plurality of measurement values, determine the respective phase shift value combination for the first phase shifter and the second phase shifter at which the measurement signal approximately assumes the extreme value, and calibrate, for a radar operation, the first phase shifter and the second phase shifter with phase shift values associated with the respective phase shift value combination at which the measurement signal approximately assumes the extreme value.

26. The radar system of claim 23, wherein the sensor circuit, for performing the phase calibration, is configured to:

adjust, using the at least one of the first phase shifter or the second phase shifter, at least one of the phase of the first RF radar signal or the phase of the second RF radar signal in such a way that the measurement signal approximately assumes the extreme value for half of a signal period of the first synchronization signal and the second synchronization signal.

27. The radar system of claim 23, wherein the sensor circuit, for performing the phase calibration, is configured to:

sample the measurement signal for different phase shift value combinations of the first phase shifter and the second phase shifter to obtain a plurality of measurement values of the measurement signal, wherein each measurement value of the plurality of measurement values corresponds to a respective phase shift value combination of the different phase shift value combinations, based on the plurality of measurement values, determine the respective phase shift value combination for the first phase shifter and the second phase shifter at which the measurement signal approximately assumes the extreme value for half of a signal period of the first synchronization signal and the second synchronization signal, and calibrate, for a radar operation, the first phase shifter and the second phase shifter with phase shift values associated with the respective phase shift value combination at which the measurement signal approximately assumes the extreme value for half of the signal period of the first synchronization signal and the second synchronization signal.

28. The radar system of claim 23, wherein the first oscillator signal and the second oscillator signal are derived from a same oscillator signal.

29. The radar system of claim 13, wherein the receiving antenna is equally spaced from the first transmitting antenna and the second transmitting antenna.

30. The radar system as claimed in claim 13, wherein the first radar chip includes one or more first digital circuits, the second radar chip includes one or more second digital circuits, and operations of the one or more first digital circuits are synchronized with operations of the one or more second digital circuits based on the first synchronization signal and the second synchronization signal.

31. The radar system as claimed in claim 13, wherein the first synchronization signal is a first clock signal, the second synchronization signal is a second clock signal, and the first synchronization signal and the second synchronization signal are generated by a common clock signal source, and wherein the first radar chip and the second radar chip, including respective RF radar transmissions from the first transmission channel and the second transmission channel, are synchronized with each other according to the first synchronization signal and the second synchronization signal.

32. The radar system as claimed in claim 13, wherein the first transmission channel is configured to generate the first RF radar signal by modulating the first RF radar signal according to the first synchronization signal such that the first RF radar signal is maintained at a first peak-to-peak amplitude while the first synchronization signal has a first signal level and is maintained at a second peak-to-peak amplitude while the first synchronization signal has a second signal level, and wherein the second transmission channel is configured to generate the second RF radar signal by modulating the second RF radar signal according to the second synchronization signal such that the second RF radar signal is maintained at a third peak-to-peak amplitude while the second synchronization signal has the first signal level and is maintained at a fourth peak-to-peak amplitude while the second synchronization signal has the second signal level.

* * * * *